United States Patent
Jackson et al.

(10) Patent No.: US 11,935,719 B2
(45) Date of Patent: Mar. 19, 2024

(54) HIGH-RELIABILITY LOW-LOSS POWER SWITCH AND DRIVER IC

(71) Applicant: SiliconBrite Technologies, Inc., Santa Clara, CA (US)

(72) Inventors: Cameron Nathan Jackson, Los Gatos, CA (US); Baris Karagozlu, Dublin, CA (US); Alexander Burinskiy, Leander, TX (US)

(73) Assignee: SiliconBrite Technologies, Inc., Santa Clara, CA (US)

( * ) Notice: Subject to any disclaimer, the term of this patent is extended or adjusted under 35 U.S.C. 154(b) by 83 days.

(21) Appl. No.: 17/886,435

(22) Filed: Aug. 11, 2022

(65) Prior Publication Data

US 2023/0049941 A1 Feb. 16, 2023

Related U.S. Application Data (60) Provisional application No. 63/231,886, filed on Aug. 11, 2021.

(51) Int. Cl.
  *H01H 9/56* (2006.01)
  *H01H 47/18* (2006.01)
  *H01H 47/22* (2006.01)
  *H04B 3/54* (2006.01)

(52) U.S. Cl.
  CPC .............. *H01H 9/56* (2013.01); *H01H 47/18* (2013.01); *H01H 47/226* (2013.01); *H04B 3/54* (2013.01); *H04B 2203/542* (2013.01)

(58) Field of Classification Search
  CPC ........ H01H 9/56; H01H 47/18; H01H 47/226; H04B 3/54; H04B 2203/542
  USPC .............................................................. 361/1
  See application file for complete search history.

(56) References Cited

U.S. PATENT DOCUMENTS

| | | | |
|---|---|---|---|
| 5,530,615 A | 6/1996 | Miller et al. | |
| 6,768,615 B2 * | 7/2004 | Liu | H01H 9/56 361/160 |
| 8,154,841 B2 | 4/2012 | Allen et al. | |
| 10,095,653 B2 * | 10/2018 | McGowan | G06F 13/4291 |
| 10,424,451 B2 * | 9/2019 | Lenig | H01H 9/56 |
| 2004/0169987 A1 | 9/2004 | Green | |

\* cited by examiner

*Primary Examiner* — Yemane Mehari
(74) *Attorney, Agent, or Firm* — GROUWSTRA IC & Software Patent; André Grouwstra (57) ABSTRACT

A power switch controller includes a condition detector, a zero crossing detector, a retimer, and a driver. The condition detector detects a change in a sense signal towards a first or second condition. The zero crossing detector detects zero crossings in an AC powerline signal. The power switch controller drives a latching relay that connects a load to powerlines. The power switch controller activates or deactivates the latching relay based on the sensed condition, and retimes activation and deactivation pulses to align the relay contact opening and closing times to coincide with the AC powerline zero crossings, compensating for contact travel times. The activation and deactivation pulses have a duration of max 20 ms, and an amplitude of at least 110% of the maximum sustainable voltage for the relay coil(s). A power-on reset deactivates the relay, aligned with a second AC zero crossing.

20 Claims, 7 Drawing Sheets

HIGH-RELIABILITY LOW-LOSS POWER SWITCH AND DRIVER IC

CROSS REFERENCES TO RELATED APPLICATIONS

This application claims priority from U.S. provisional patent application Ser. No. 63/231,886, entitled "High-Reliability Low-Loss Power Switch and Driver IC", filed on 11 Aug. 2021, which is hereby incorporated by reference as if set forth in full in this application for all purposes.

This application is related to U.S. provisional patent application Ser. No. 63/167,653, entitled "Electronic Fuse System and Method", filed on Mar. 30, 2021, which is hereby incorporated by reference as if set forth in full in this application for all purposes.

BACKGROUND

Technical Field

The disclosed technology relates generally to systems and methods used in power supply or regulation systems, and in particular to those for switching large AC currents with high efficiency.

Context

When high-power loads must be switched on or off with high efficiency, solid-state (semiconductor) switches cannot always be used because they dissipate too much power. Electromechanical relays can have a much lower on-resistance than solid-state switches and dissipate much less. However, their lifetime may be shortened exponentially with the amplitude of the current being switched, forcing high-power switches to use expensive relays.

The problems in relays include bouncing when a relay is switched on, and arcing due to parasitic inductance when large currents are switched off. When contacts are nearly closed but at strongly different voltage levels, arcing may decompose organic matter contained in the air, and cause deposits such as oxides and carbides to develop on the contacts. Additionally, melting may occur, causing welding of the contacts, or transfer of contact material that results in uneven surfaces that may eventually lock mechanically. Bouncing exacerbates the problems by repeatedly making and breaking before a steady state is reached. The number of bounces the contacts make before reaching a steady state may significantly count towards the end of the relays life. Relays may also suffer from overheating of the coil. High coil temperatures further reduce the lifetime of the contacts, and can also result in burnout of the coil itself.

Latching relays are bistable and switch between two states when driven. They may be driven with a constant signal or with a pulse. Some latching relays include a single coil requiring the drive polarity to be reversed between operation (the make action) and release (the break action). Other latching relays include a single coil with a center tap. Those latching relays require a signal on one coil end for operation and on the other coil end for release. Yet other latching relays have separate coils, and may be driven a similar way as latching relays with a center tap. Because latching relays may be switched with just a pulse, the switch efficiency can be much higher, and coil overheating can be much less of a problem.

Relays are slow. Generally, they have operation and release times in the order of tens of milliseconds. Some more expensive relays, such as vacuum relays, may have better operation and release times, but they are often still in the range of a millisecond.

Unless otherwise indicated herein, elements described in this section are not prior art to the claims and are not admitted being prior art by inclusion in this section.

SUMMARY

Implementations of the disclosed technology use a pulse-controlled bistable switch, for example a latching relay. The pulse-controlled bistable switch couples a high-power electric or electronic system (load) to AC power lines. An implementation may protect the load from over-voltages, under-voltages, and/or other conditions that may damage those loads or that are otherwise undesirable.

A relays lifetime and reliability may decrease exponentially with the current being switched. Switching near or at the zero crossings can significantly increase the reliability and lifetime of the relay.

To protect the relay from switching high currents, implementations synchronize the physical switch timing with zero crossings of the switched AC power. Electromechanical relays are known as slow devices with a switching speed in the order of tens of milliseconds. The inventors have performed experiments that have shown that despite the relatively slow switching speeds due to mechanical movements, good synchronization with zero crossings is possible by optimizing the relay's coil activation power for the lowest switch time uncertainty, and individually retiming the coil switching signals to compensate for operation time (make time) and release time (break time).

Although compensation of mechanical delays has been known for some time, implementations of the disclosed technology use shaped pulses to activate the pulse-controlled bistable switch. The inventor experiments have shown that asserting the coil of a latching relay with a voltage at least 10% higher than the rated maximum sustainable coil voltage shortens opening and closing time, reduces the variation in the opening and closing time, and reduces the temperature dependence of the opening and closing time. It was found that shaped pulses shorter than 20 milliseconds can reduce bounce. Heating of the coil can generally be prevented when successive pulses (whether for make or for break) are at least 50 milliseconds apart.

Implementations use a first shaped pulse for making and a second shaped pulse for breaking. Pulse shaping may be simple (pulse height and pulse duration) or more sophisticated, where the pulse shape may have additional features. The innovations presented herein make it possible to switch high currents with a relatively inexpensive switch, while protecting the switch's reliability, and protecting the load against switch-induced spikes.

In a first aspect, an implementation provides a method for switching AC power supplied by a powerline to a load. The method has the following steps.

It couples a pulse-controllable bistable switch between the powerline and the load. It applies a sense signal to an input of a condition detector, where it compares a sense signal value with a first threshold to sense a first condition and with a second threshold to sense a second condition. The first condition requires providing power to the load (must make) and the second condition requires interrupting power to the load (must break). The method waits for a change in the condition.

Upon sensing a change to the first condition, it detects a first zero crossing; waits a first delay time after the first zero crossing; and applies a first shaped pulse to the pulse-controllable bistable switch to assert the pulse-controllable bistable switch.

Upon sensing a change to the second condition, it detects a second zero crossing; waits a second delay time after the second zero crossing; and applies a second shaped pulse to the pulse-controllable bistable switch to deassert the pulse-controllable bistable switch.

The first shaped pulse and the second shaped pulse have durations shorter than a predetermined maximum duration (of 20 or 2000 milliseconds). The first shaped pulse and the second shaped pulse have a maximum amplitude of at least 110% of a maximum sustained coil voltage; and they begin at least 50 milliseconds after a prior first shaped pulse or a prior second shaped pulse ended.

The method may further comprise detection of the start of a powerline voltage, for example in a power-on-reset (POR) function. It detects a numerically first zero crossing and a numerically second zero crossing in the powerline voltage, and applies a second shaped pulse to the pulse-controllable bistable switch to deassert the pulse-controllable bistable switch. The second shaped pulse is substantially aligned with the numerically second zero crossing.

In a second aspect, an implementation provides a power switch controller. It includes (1) a condition detector, (2) a zero crossing detector, (3) a retimer, and (4) a driver. The condition detector detects a change in a sense signal towards a first or second condition. It is coupled with an input of the retimer, to which it provides a detected conditions signal. The zero crossing detector detects zero crossings in an AC input signal. It is coupled with another input of the retimer and provides a zero crossing indicator signal to the retimer. The retimer is coupled with an input of the driver, to which it supplies a retimed must-make signal and a retimed must-break signal. The power switch controller may further include a power-on-reset function, coupled with the retimer. The retimer performs functionality as described in the method in the first aspect, above.

In a third aspect, an implementation provides an AC switch system. It includes a latching relay coupled in series with a load and power lines (Line and Neutral). A power switch controller drives the latching relay. It has at least one coil output coupled with a coil of the latching relay. A zero crossing detection resistor is coupled between the power line and a power switch controller zero input. A sense input of the power switch controller, senses one or more predetermined conditions that cause the power switch controller to activate the latching relay by applying a first shaped pulse to a first coil terminal of the latching relay, and/or to deactivate the latching relay by applying a second shaped pulse to a second coil terminal of the latching relay. The first shaped pulse and the second shaped pulse have durations shorter than a predetermined maximum duration (of 20 or 2000 milliseconds). The first shaped pulse and the second shaped pulse have a maximum amplitude of at least 110% of a maximum sustained coil voltage; and they begin at least 50 milliseconds after a prior first shaped pulse or a prior second shaped pulse ended.

The AC switch system may further comprise a circuit that generates a supply voltage $V_{DD}$ within a single cycle of an AC voltage on the power line. The circuit may include a source follower (or emitter follower, etc.) that copies a voltage over a Zener diode that is powered via a rectifier diode, a supply resistor, and a bias resistor. The bias resistor and the Zener diode bias a transistor that is connected as a source/emitter follower supplying the supply voltage $V_{DD}$.

A further understanding of the nature and the advantages of particular implementations disclosed herein may be realized by reference of the remaining portions of the specification and the attached drawings.

BRIEF DESCRIPTION OF THE DRAWINGS

The disclosed technology will be described with reference to the drawings, in which.

In the figures, like reference numbers may indicate functionally similar elements. The systems and methods illustrated in the figures, and described in the Detailed Description below, may be arranged and designed in a wide variety of different implementations. Neither the figures nor the Detailed Description, are intended to limit the scope as claimed. Instead, they merely represent examples of different implementations of the disclosed technology.

DETAILED DESCRIPTION

Implementations of the disclosed technology use a pulse-controlled bistable switch, for example a latching relay. The pulse-controlled bistable switch couples a high-power electric or electronic system (load) to AC power lines. An implementation may protect the load from over-voltages, under-voltages, and/or other conditions that may damage those loads or that are otherwise undesirable.

A relays lifetime and reliability may decrease exponentially with the current being switched. Switching near or at the zero crossings can significantly increase the reliability and lifetime of the relay.

To protect the relay from switching high currents, implementations synchronize the physical switch timing with zero crossings of the switched AC power. Electromechanical relays are known as slow devices with a switching speed in the order of tens of milliseconds. The inventors have performed experiments that have shown that despite the relatively slow switching speeds due to mechanical movements, good synchronization with zero crossings is possible by optimizing the relay's coil activation power for the lowest switch time uncertainty, and individually retiming the coil switching signals to compensate for operation time (make time) and release time (break time).

Although compensation of mechanical delays has been known for some time, implementations of the disclosed technology use shaped pulses to activate the pulse-controlled bistable switch. The inventor experiments have shown that asserting the coil of a latching relay with a voltage at least 10% higher than the rated maximum sustainable coil voltage shortens opening and closing time, reduces the variation in the opening and closing time, and reduces the temperature dependence of the opening and closing time. It was found that shaped pulses shorter than 20 milliseconds can reduce bounce. Heating of the coil can generally be prevented when successive pulses (whether for make or for break) are at least 50 milliseconds apart.

Implementations use a first shaped pulse for making and a second shaped pulse for breaking. Pulse shaping may be simple (pulse height and pulse duration) or more sophisticated, where the pulse shape may have additional features. The innovations presented herein make it possible to switch high currents with a relatively inexpensive switch, while protecting the switch's reliability, and protecting the load against switch-induced spikes.

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object and does not imply any ranking or sequence.

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetical, or mechanical, between the things that are connected, without any intervening things or devices.

The terms "substantially", "close", approximately", "near", and "about" refer to being within minus or plus 10% of an indicated value, unless explicitly specified otherwise.

AC—alternating current—an electric current that reverses its direction regularly or irregularly.

Assert—to set a signal or a bit line in a state that is equivalent to a Boolean value of "true" or "active", or to cause a relay or switch to close.

DC—direct current—an electric current that flows in only one direction.

Deassert—to set a signal or a bit line in a state that is equivalent to a Boolean value of "false" or "inactive", or to cause a relay or switch to open.

IC—integrated circuit—this may be a monolithically integrated circuit, i.e., a single semiconductor die that includes a circuit, or it may be a multichip module that includes multiple semiconductor dies in a single package and that may further include a substrate onto which the dies are mounted, and further electronic devices.

Latching relay—a bistable relay, that may be driven with a constant drive signal or just a short pulse to connect or disconnect. Latching relays may have two separate coils (one for make and one for break), a single coil with centertap, or just a single coil. In contrast with common usage, in implementations described in this document it is assumed that a latching relay is always driven with a pulse.

Operation time—The time between applying power to a relays coil and the establishment of an electrical connection between the contacts, due to the contacts traveling from the steady-state break position to the steady-state make position.

Release time—the time between interrupting power to a relays coil and the end of the electrical connection between the contacts, due to the contacts traveling away from the steady-state make position.

Implementations

Figure 1:
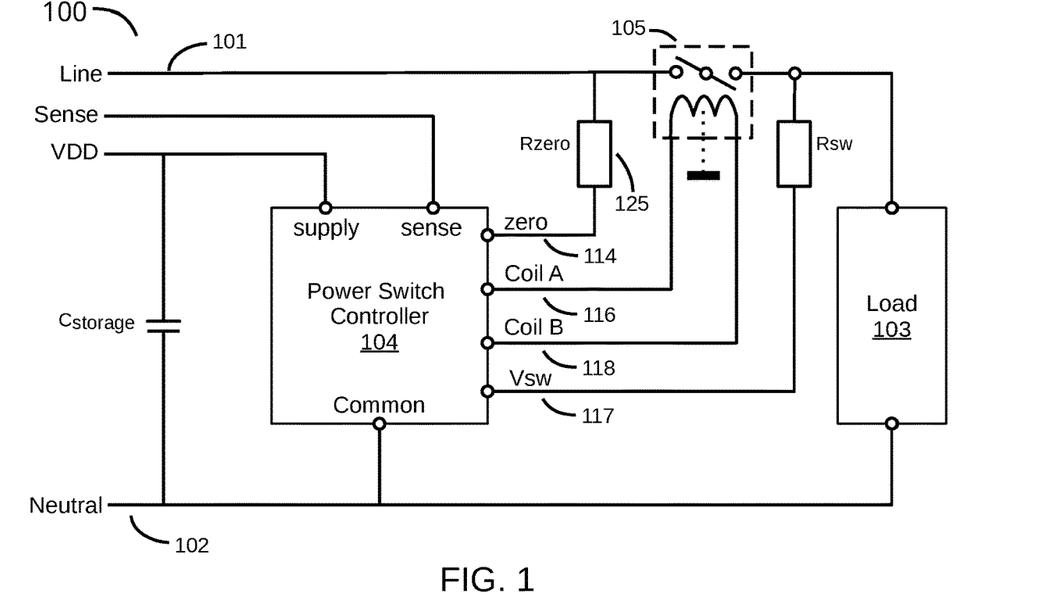
FIG. 1 illustrates an example AC switch system including a power switch controller.

FIG. 1 illustrates an example AC switch system 100 including a power switch controller 104. AC switch system 100 includes power line 101, neutral line 102, load 103, and relay 105, which may be or include a latching relay. Power switch controller 104 may be powered from a supply voltage $V_{DD}$. A first zero detection resistor 125 may be coupled between power line 101 and zero detection terminal 114 of power switch controller 104 to detect a zero crossing. Some implementations include a second zero detection resistor, coupled with a second zero detection terminal, to detect a zero crossing in a differential signal. Other implementations do not use first zero detection resistor 125, but may use a current sensing loop instead. The coil(s) of relay 105 is/are coupled with first output 116 and/or second output 118 of power switch controller 104.

AC switch system 100 has a sense input 111 that senses a condition that should cause relay 105 to make or break, coupling or de-coupling power line 101 to or from load 103. The condition may be sensed from an analog signal such as a voltage, a current, temperature, or some other physical quantity, a physical quality such as the frequency of an analog signal, or from a digital signal such as a digital code, or simply an on/off switch. The condition may be based on a user input, a schedule, a detected situation, or a virtual situation. Some implementations may include multiple sense inputs to sense multiple different conditions. Some implementations may sense the timing of closure of relay 105 by sensing the switched signal at the output of relay 105 and forwarding it to a Vsw input 117 of power switch controller 604.

Power switch controller 104 may implement any methods explained in this document. Implementations may be analog, digital, mixed-signal, or including any processor(s) that execute software instructions in a non-transitory computer-readable medium, such as a read-only memory (ROM), a flash memory, and any other type of non-volatile memory commonly used in association with microcontrollers.

Although in the implementation shown in FIG. 1 the power switch controller has a common connection to the neutral line and its supply voltage $V_{DD}$ is referenced to the neutral line, other implementations may have their common connection to the power line and their supply voltage referenced to the power line.

Figure 2:
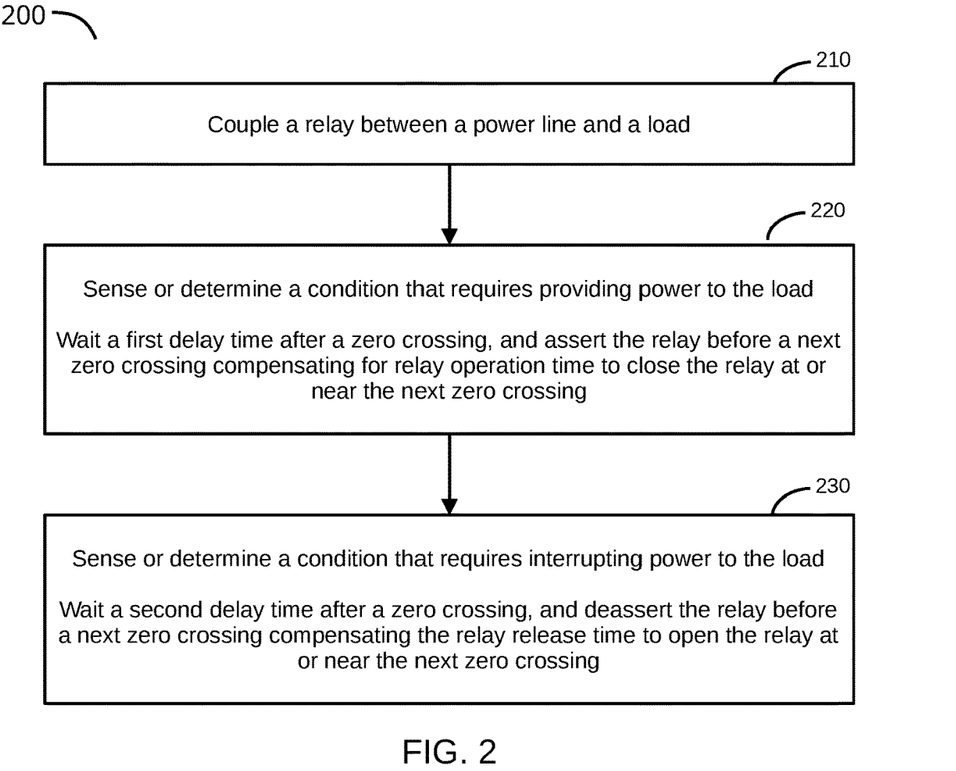
FIG. 2 illustrates an example method to switch AC power supplied by a power line to a load.

FIG. 2 illustrates a method 200 to switch AC power supplied by a power line to a load in an implementation of the disclosed technology. Method 200 includes the following steps.

Step 210—coupling a relay between the power line and the load. The relay may be any kind of relay, including a regular relay, or a latching relay.

Step 220—sensing a condition that requires providing power to the load. Upon sensing the condition that requires providing power to the load, the method waits a first delay time after a first zero crossing, and asserts the relay compensating for the relay operation time to close the relay at or near the second zero crossing. The method may include waiting at least a minimum-off time, or lockout time, before measuring the first zero crossing.

Step 230—sensing a condition that requires interrupting power to the load. Upon sensing the condition that requires interrupting power to the load, the method waits a second delay time after a third zero crossing, and deasserts the relay compensating for the relay release time to open the relay at or near a fourth zero crossing.

The AC power has a has a first cycle time that is the inverse of the AC frequency. For example, at an AC frequency of 50 Hz, the first cycle time equals 20 milliseconds, and at an AC frequency of 60 Hz, the first cycle time equals about 16.67 milliseconds. Each cycle has two zero crossings, so the time between zero crossings is 10 or about 8.33 milliseconds, respectively. An implementation can achieve synchronization by waiting up to half a cycle. Some implementations may synchronize over a full cycle, or over any integer number of half cycles. In the case of synchronization over half a cycle, the sum of the first delay time and the relay operation time must approach half the first cycle time within a narrow margin, for example within twenty percent.

Whereas some implementations wait for a zero crossing after a condition detector detects a change in the condition based on the sensed signals, and then wait a first delay time, other implementations may wait for a change in the detected condition after detecting a zero crossing, and compensate for the time between the zero crossing and the change in sensed condition, as well as for the relay time. For example, when the AC frequency is 60 Hz, a must-make condition is detected 1.5 milliseconds after a zero crossing, and the relay operation time is 4 milliseconds, then the optimum first delay time equals 8.33−1.5−4=2.83 milliseconds. For acceptable operation, the sum of the relay operation time and the first delay time, including any uncertainties due to component tolerances, etc., must lie between 0.9*8.33=7.5 milliseconds and 1.1*8.33=9.17 milliseconds. If a must-break condition is detected 5.7 milliseconds after a zero crossing and the release time equals 2.8 milliseconds, then an optimum second delay time equals 16.67−5.7−2.8=8.17 milliseconds, and the second delay time, including any uncertainties, must be between 7.34 and 9.00 milliseconds.

Method 200 may further comprise optimizing the relay coil power, for example for the lowest variations in relay operation time and/or relay release time, or for the shortest relay operation time and/or relay release time, or for the shortest relay operation time and/or relay release time without bounce.

Sensing the condition that requires providing power to the load may comprise measuring a first sensed value and comparing the first sensed value with a first threshold, and sensing the condition that requires interrupting power to the load may comprise measuring the first sensed value and comparing the first sensed value with a second threshold. The first and the second threshold may determine a hysteresis. The first sensed value may represent, for example, a temperature, and the first threshold and the second threshold represent a maximum allowed temperature. Instead of simple thresholds, method 200 may use window thresholds, and determine if a sensed value is within or outside the window boundaries. The window boundaries may also have a hysteresis. The window might represent, for example, a temperature range, or a powerline voltage range, or any other range of interest.

In implementations that have multiple sense inputs, determining a must-make condition may include determining that all sensed values allow for coupling the load to the powerline. Determining a must-break condition may include determining that any of the sensed values indicates that the load must be decoupled from the powerline.

Figure 3:
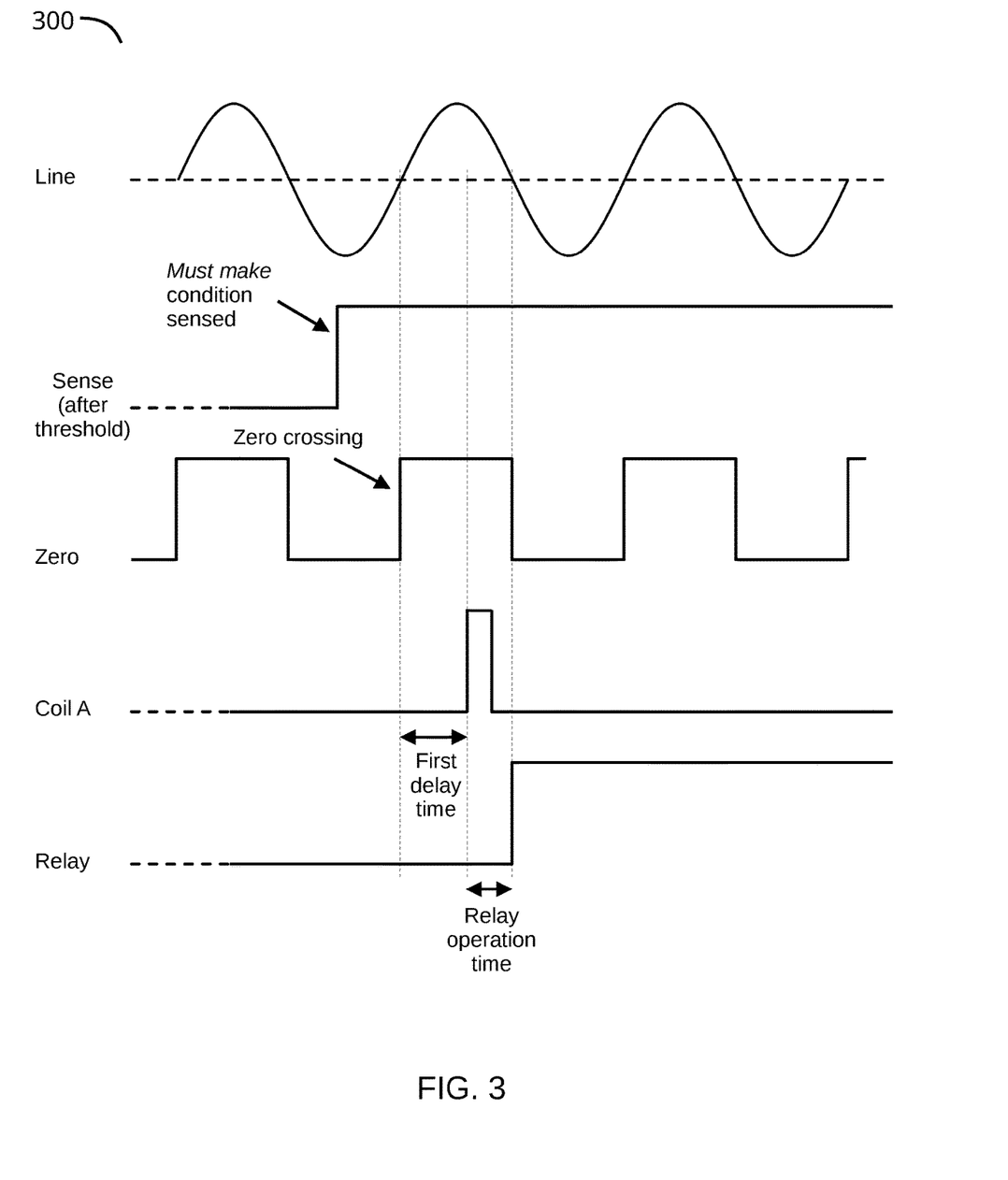
FIG. 3 illustrates an example of timing performed by the power switch controller.

FIG. 3 illustrates an example of timing performed by the power switch controller. It shows the powerline signal (Line), which may be a sine voltage or a sine current. It shows that at some time, a condition detector coupled with the sense input detects a must-make condition (FIG. 3 shows an example of a condition detector output signal, or the sensed condition after comparison with one or more thresholds). The implementation waits until a next zero crossing is detected in the powerline signal. Then, the implementation waits for the configured or programmed first delay time before asserting the Coil A output. It outputs a pulse, which may be shaped to prevent bouncing, and provides the pulse to the relay coil. The relay may be slow, and have a relay delay time between receiving the signal from the Coil A output and establishing contact. Because the first delay time is configured or programmed to complement the relay delay time, the relay established contact at, or very close to, the next zero crossing of the powerline signal. In this example, the first delay time should ideally equal half the powerline cycle time, minus the relay delay time. Compensating for various margins, the sum of the first delay time and the relay delay time should be within 20 percent from half the powerline cycle time.

Timing after detection of a must-break condition is similar. After sensing the must-break condition, the implementation waits for a zero crossing. Then it waits a second delay time before deasserting the relay. The implementation compensates for the relay release time if the sum of the second delay time and the relay release time is within 20 percent from half the powerline cycle time.

Figure 4:
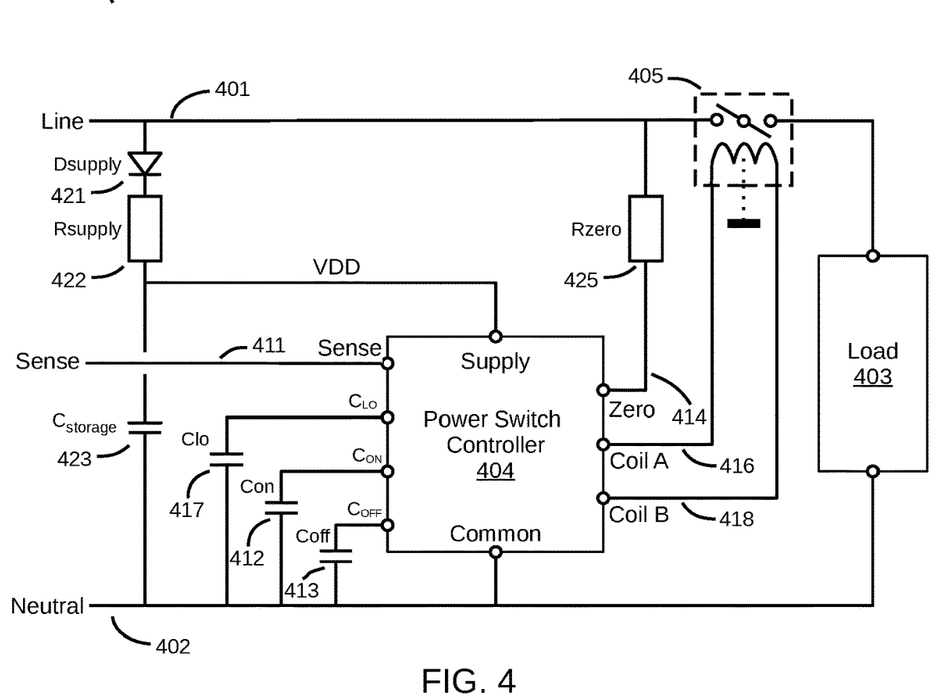
FIG. 4 illustrates an example AC switch system, along with power lines and a load.

FIG. 4 illustrates an example AC switch system 400, along with a powerline 401, a neutral line 402, and a load 403. AC switch system 400 further includes power switch controller 404 and pulse-controllable bistable switch 405, which may be or include a latching relay. Pulse-controllable bistable switch 405 is coupled between powerline 401 and load 403. In some implementations, pulse-controllable bistable switch 405 is coupled between load 403 and neutral line 402. Power switch controller 404 may be directly coupled to powerline 401 and/or neutral line 402. Power switch controller 404 may receive a supply current from powerline 401 via rectifier diode 421 and supply resistor 422 (as shown), or from a battery, a voltage regulator, a switched mode power supply, or any other suitable supply known in the art. A storage capacitor 423 may act as an energy reservoir to stabilize the controllers supply voltage. Power switch controller 404 has a sense input 411 that is configured to sense a condition. The condition may be a switched signal, for example the result of a timer, or a user pressing a start or stop button; or the condition may be of an analog nature, such as a voltage or a current representing a temperature, a power line voltage, a power line current, a power line frequency, or any other physical or even virtual condition. Power switch controller 404 also detects a zero crossing in an AC signal, for example as shown, where power switch controller 404 detects a zero crossing in the voltage of the AC powerline 401. A first zero crossing detection resistor 425 may be coupled between a first zero input of power switch controller 404 and powerline 401. In some implementations, power switch controller 404 may have a second zero input, and a second zero crossing detection resistor may be employed to sense a differential signal related to the zero crossing occurrence. By measuring a voltage on powerline 401, power switch controller 404 determines if a zero crossing occurs on powerline 401. Some implementations may measure the current that is actually flowing through pulse-controllable bistable switch 405, or that would be flowing through pulse-controllable bistable switch 405 if it were closed, by employing a current sense loop or a low-resistance series resistor. Upon sensing a condition that requires operating or releasing pulse-controllable bistable switch 405, power switch controller 404 provides a shaped pulse on its coil A output 416 and/or coil B output 418 after retiming a make-or-break signal to occur sometime before a next zero crossing, compensating for mechanical and/or other delays involved in operating or releasing pulse-controllable bistable switch 405. Further details of an example power switch controller 404 are provided with reference to FIG. 5.

Some implementations provide a lockout timer in power switch controller 404. The lockout timer may be coupled with a lockout time capacitor 417 between power switch controller 404 ($C_{LO}$ terminal) and neutral line 402, or between power switch controller 404 ($C_{LO}$ terminal) and the power switch controller 404 supply terminal. The function of the lockout timer is to guarantee a minimum off-time by holding the pulse-controllable bistable switch 405 release state for a lockout duration after a condition occurs that causes power switch controller 404 to interrupt power to load 403. If the condition occurs again during the lockout, the lockout timer may reset and extend the lockout duration. The lockout duration may be configurable by the size of lockout time capacitor 417. For example, an implementation may provide one second of lockout duration per nanofarad capacitance. In implementations that do not provide the $C_{LO}$ terminal, the lockout duration may be programmable, for example via a register setting.

AC switch system 400 may further include first zero crossing detection resistor 425 between powerline 401 and first zero detection input 414. An operation timer capacitor 412 may configure an operation time compensation delay, and a release timer capacitor 413 may configure a release time compensation delay.

Figure 5:
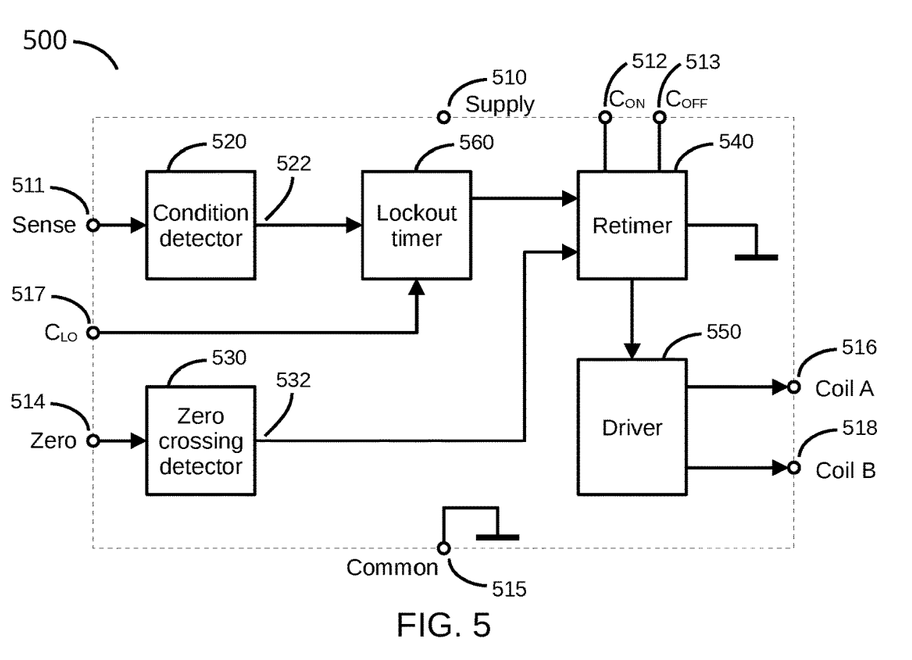
FIG. 5 illustrates an example switch driver IC.

FIG. 5 illustrates an example power switch controller 500. Power switch controller 500 may be implemented as an IC. Other implementations may provide the functionality, for example, by a combination of off-the-shelf devices on a printed circuit board (PCB). Power switch controller 500 includes a condition detector 520 with a sense input 511 and a condition result output 522. The condition detector 520 can detect a must-make condition and/or a must-make condition. A zero crossing detector 530 has at least a first zero input 514, and a zero crossing indicator output 532. A retimer 540 has a condition result input directly or indirectly coupled with the condition result output 522 to receive a retimer input signal, a zero crossing input coupled with the zero crossing indicator output 532, and a retimer output. A driver 550 has an input coupled with the retimer output, and one or more coil outputs (coil A output 516 and coil B output 518 are shown). Some implementations may include a lockout timer 560, coupled in between condition detector 520 and retimer 540. Lockout timer 560 has a lockout duration that may be programmable, for example through a register setting, and/or configurable, for example by the capacitance of a lockout time capacitor externally connected to a lockout capacitor terminal 517. It may also be programmed and/or configured by other means, such as a resistor value, an IC bond option, a voltage applied to an external terminal of the IC, the content of a non-volatile memory or one-time-programmable memory, an IC mask option, or any other method known in the art.

Retimer 540 performs operation time compensation and release time compensation by introducing an operation time delay (the first delay time) after a detected zero crossing when a must-make condition has been detected, and a release time delay (the second delay time) after a detected zero crossing when a must-break condition has been detected. The operation time delay and the release time delay may be programmable, for example by register settings, and/or configurable, for example by externally connecting an operation timer capacitor to operation time terminal 512 and a release timer capacitor to release time terminal 513. It may also be programmed and/or configured by other means, such as resistor values, IC bond options, voltages applied to external terminal of the IC, the contents of a non-volatile memory or one-time-programmable memory, IC mask options, and any other methods known in the art.

Retimer 540 is configured to output a retimed make-or-break signal in response to a change in the condition result input signal by waiting for a time of a zero transition in the AC signal and outputting a must-make value after the first delay time after the zero transition in the AC signal or outputting a must-break value after the second delay time after the zero transition in the AC signal.

The implementation in FIG. 5 shows a coil A output 516 and a coil B output 518. Power switch controller 500 has at least the following external terminals (e.g., pins in a small outline IC (SOIC) package, balls in a ball-grid array, or bumps on a bare die): supply 510, common 515, sense input 511, first zero input 514, and coil A output 516. Some implementations may further include a second zero input to allow for a differential signal, a second sense input to allow for separate sense inputs for must-make and must-break conditions, operation time terminal 512, release time terminal 513, lockout capacitor terminal 517 and/or coil B output 518.

In some implementations, condition detector 520 includes a threshold detector. The threshold detector compares the sensed signal at sense input 511 with a threshold, which may be preset, programmable (determined by a register), or configurable (e.g., determined by a voltage on an external terminal). The threshold may also be designed, programmed, or configured to have a hysteresis to prevent instabilities. Based on the comparison, it produces the condition result. The condition result may indicate must make when a sensed signal is larger than the threshold and must break when the sensed signal is smaller than the threshold. In further implementations, the condition result indicates must break when the sensed signal is larger than the threshold and must make when the sensed signal is smaller than the threshold. In yet further implementations, the polarity of the condition result based on the comparison is programmable or configurable.

In another implementation, condition detector 520 includes a window detector. The window detector determines if the sensed signal is inside or outside a window, which is determined by two or more windows thresholds. The window thresholds may be preset, programmable, or configurable. The window thresholds may also have hysteresis to prevent instabilities. In even further implementations, condition detector 520 may have multiple sense inputs, multiple threshold detectors, and/or multiple window detectors, or any combination of sense inputs, threshold detectors, and window detectors.

In some implementations, lockout timer 560 may be included in condition detector 520, retimer 540, driver 550, or coupled in between retimer 540 and driver 550. The lockout timer may start when a condition result indicates must break, and hold its output signal for the lockout duration before allowing a change that results in reconnecting the relay.

Zero crossing detector 530 is configured to detect times of zero current in or zero voltage on a power line. It monitors a signal on first zero input 514, or it may monitor a signal between two zero inputs. A signal may be picked up as a voltage, a voltage between two different nodes, for example between two terminals of the relay, or it may be picked up using a current sensor around the power line. A current sensor may be open loop or closed loop, and power switch controller 500 may amplify a sensed signal, or the sensed signal may be amplified externally before being presented to first zero input 514.

Retimer 540 receives the condition result from condition detector 520. Upon a change in the condition result, retimer 540 waits for a zero crossing detected by zero crossing detector 530, then adds a first delay time (for make) or a second delay time (for break) before changing its output signal between make and break. If correctly configured, the first delay time plus a relay operation time equals half a cycle (or an integer number of half cycles) of the AC power, and the second delay time plus a relay release time also equals half a cycle (or an integer number of half cycles) of the AC power. This way, power switch controller 500 will properly compensate for the externally connected electromechanical relay operation time and release time, and will be able to properly make or break at the time of a zero crossing. Retimer 540 may have programmable or configurable first delay time and/or second delay time, for example using a register setting or one or more external terminals. Retimer 540 outputs a make-or-break signal to driver 550.

Driver 550 receives the make-or-break signal and generates an output signal on a coil output, or two output signals on two coil outputs, or more output signals on more coil outputs. The one or more output signals can drive a relay, for example one or more relay coils, and make it change state between make and break. If the relay is a regular relay, the output signal may be a constant voltage or current for the duration of the make state. If the relay is a latching relay, the output signal may be a pulse that triggers a change between make and break. Driver 550 may determine the amplitude, duration, and/or shape of such a pulse. The amplitude, duration, and shape of the pulses may each be programmable or configurable, so that system using the power switch controller can set a fastest or most consistent make or break time, or so that the system can minimize or prevent bounce, or so that the system can optimize between the different aspects of its performance as may be needed for a particular application or situation.

Figure 6:
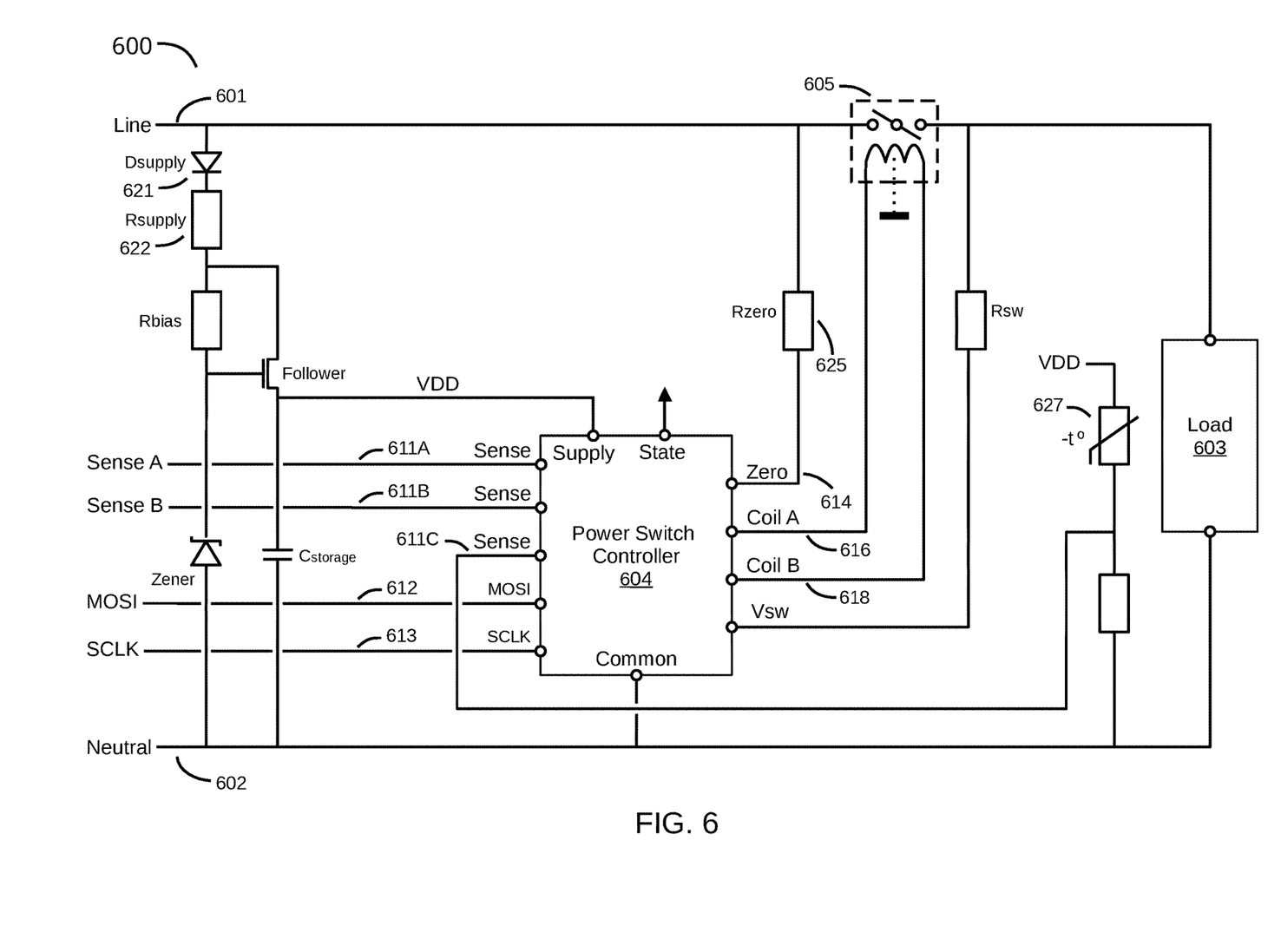
FIG. 6 illustrates an example AC switch system with digital control, along with power lines and a load.

FIG. 6 illustrates an example AC switch system 600 with digital control, along with power lines and a load. AC switch system 600 includes power line 601, neutral line 602, load 603, power switch controller 604, and pulse-controllable bistable switch 605, which may be or include a latching relay, etc. Power switch controller 604 may be powered from a supply voltage $V_{DD}$, and may include a digital interface, for example a serial interface such as SPI or I²C with a serial data line 612 line (MOSI) and a serial clock line 613 (SCLK). The serial interface allows control of timer settings, loading relay models, placing the circuit in a calibration or learning mode, and it may further allow communication of a must-make command or a must-break command. Implementations have one or more sense inputs (sense inputs 611A-C are drawn) that may be capable of sensing conditions of an analog and/or digital nature. AC switch system 600 may further include a zero crossing detection resistor 625 coupled between power line 601 and a first zero input 614. However, some implementations do not use a resistor to detect a zero crossing, but, for example, a current sense loop coupled with first zero input 614. Pulse-controllable bistable switch 605 has one or more control terminals, coupled with one or more coil outputs of the power switch controller 604. When AC switch system 600 determines that pulse-controllable bistable switch 605 must change state between make and break, it powers or interrupts power to the pulse-controllable bistable switch 605 control terminal, synchronized to a zero crossing, and may compensate for mechanical or other delays in the switch device.

In the example drawn, the supply voltage $V_{DD}$ is generated by a circuit that includes a supply diode 621 $D_{supply}$, a supply resistor 622 R_supply, and a "follower" transistor in a common drain or common collector configuration, i.e., a source follower, emitter follower, Darlington, etc., that is biased by a bias resistor $R_{bias}$ and a Zener diode. $V_{DD}$ is stabilized by a storage capacitor $C_{storage}$. Supply diode 621 and supply resistor 622 are coupled with power line 601, in series and without a preferred order. They are further coupled in series with the bias resistor and the Zener diode, which is coupled with neutral line 602. During positive cycles of the powerline voltage at power line 601, a current runs through supply diode 621, supply resistor 622, $R_{bias}$, and the Zener diode. The current provides a bias voltage for the follower transistor, which copies the voltage at the Zener diode. However, because of the storage capacitor, the supply voltage $V_{DD}$ does not strictly follow the variations of the Zener diode voltage. The circuit generating $V_{DD}$ can be very fast, enabling power switch controller 604 to start up within a single cycle of the AC voltage on power line 601 and enable safe power conditions.

To detect and halt dangerous situations in which load 603 or an overvoltage protector overheats, a negative temperature coefficient resistor (NTC 627) measures the temperature of load 603 or the overvoltage protector to generate a sense value that is applied to one of the sense inputs 611. If the voltage on the sense input becomes too high, it crosses a must-break threshold causing power switch controller 604 to deassert pulse-controllable bistable switch 605. Other implementations may use a temperature-sensitive element other than an NTC, for example a positive temperature coefficient resistor (PCT).

Further sense inputs 611 may be coupled with circuits that measure over-voltages, over-currents, under-voltages, and any other conditions that may be dangerous or otherwise undesirable. Similarly, sense inputs 611 may be coupled with circuits that measure conditions that are desired or required.

Power switch controller 604 has a Vsw input that via resistor Rsw senses the switched output, i.e., the voltage (or current) after pulse-controllable bistable switch 605. This allows the implementation to measure timing of the switched signal and compare it to the timing of zero crossings measured on first zero input 614. Deviations in the timing are errors, which can be used during a calibration cycle, or while in a self-learning mode while constantly or regularly monitoring.

Power switch controller 604 may further have a "State" output that signals whether the switch (pulse-controllable bistable switch 605) should be open or closed. This output can be used as an indicator, for example for external circuits or for a control light and/or optocoupler.

Figure 7:
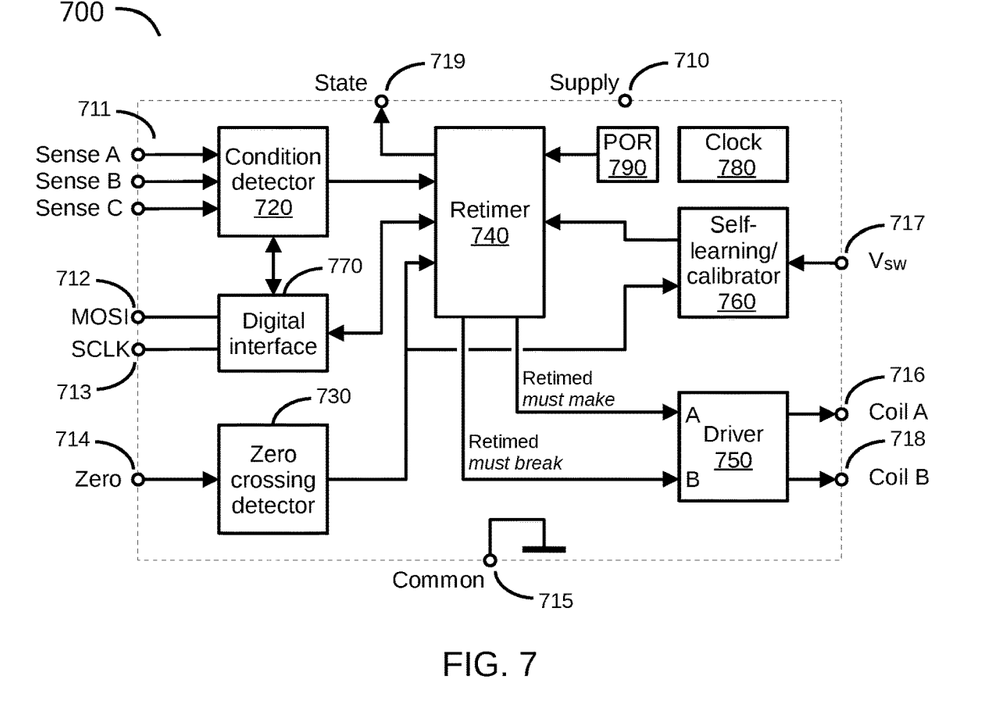
FIG. 7 illustrates an example switch driver IC with digital control.

FIG. 7 illustrates an example power switch controller 700 with digital control. Power switch controller 700 may be implemented as an integrated circuit (IC) or otherwise and includes the following functional blocks: condition detector 720, zero crossing detector 730, retimer 740, driver 750, and optionally digital interface 770 (which may be or include a serial interface) and/or calibrator 760, which may be self-learning. Power switch controller 700 includes at least the following external terminals: supply 710, common 715, one or more sense inputs 711, first zero detect input 714, and coil A output 716. Some implementations also have some or all of a second zero detect input, switched line input 717, coil B output 718, serial data 712, and serial clock 713, and state indicator 719.

Condition detector 720, receives a sense signal on at least one of the sense inputs 711, and compares it with one or more thresholds and/or windows to determine a condition result: must make or must break (the detected conditions). Thresholds and windows may each have their own hysteresis. Thresholds, windows, hysteresis settings and result polarities may all be programmable and determined by registers that may be accessed via digital interface 770. In some implementations, the condition result itself can be set or overridden via a register setting. Condition detector 720 forwards the condition result to retimer 740. Condition detector 720 may have one or multiple sense inputs 711. Each sense input may measure a different parameter and/or parameter type, related to some condition such as voltage, current, temperature, or frequency. Any combination of these input parameters can elicit a change in the detected conditions. For example, an implementation may change to must break if any of the input parameters associates with a must-break condition, whereas it changes to must make only if all input parameters associate with must-make conditions. How an implementation responds to a particular combination of sensed signals may be built-in and fixed, or it may be programmable.

Zero crossing detector 730 detects whether a zero crossing occurs from the signal(s) on its input(s), first zero detect input 714 and optionally the second zero detect input. The zero crossing may occur in a sensed voltage, such as the voltage on power line 601, in a sensed differential voltage, or in a sensed current, e.g., measured by a current sense loop. When zero crossing detector 730 detects a zero crossing, it provides an output signal that it forwards to retimer 740. Implementations that include calibrator 760 also forward the detected zero crossing to calibrator 760.

Retimer 740 receives a must-make or must break signal from condition detector 720. It also receives the output signal from zero crossing detector 730 indicating when a zero crossing occurs. When retimer 740 detects a change in the must-make or must break signal, it waits for an occurrence of a zero crossing event, upon which it starts a timer to wait for a first delay time or a second delay time, respectively. Further details of an example implementation of retimer 740 are described with respect to FIG. 8.

Driver 750 receives retimed must-make and must break signals from retimer 740. In some implementations, driver 750 is configured to drive a regular relay, in which case it may power its coil A output 716 for the duration of the must-make signal. In other implementations, driver 750 is configured to drive a latching relay, in which case it may power or provide a first shaped pulse to its coil A output 716 when a retimed must-make signal starts, and a second shaped pulse to its coil B output 718 when a retimed must break signal starts. In a further implementation, driver 750 may be programmed to drive either a regular relay or a latching relay via a register setting that is accessible through digital interface 770. The duration, amplitude, and shape of the first shaped pulse and the second shaped pulse may be preset or programmable to optimize relay times and/or to prevent or reduce bounce.

Calibrator 760 receives zero crossing signals from zero crossing detector 730, and the switched powerline voltage at the output of pulse-controllable bistable switch 605 via the Vsw input. Implementations that merely calibrate can be set in calibration mode, in which calibrator 760 may run one or more tests to open and close the relay, measuring its actual opening and closing times from the Vsw input, and comparing those with the required opening and closing times as indicated by detected zero crossings. Calibrator 760 may forward the measured errors to retimer 740 so that in subsequent uses retimer 740 can correct the measured errors in the retimed must-make and must break signals. A disadvantage of mere calibration is that it generally requires that the load be offline, since otherwise it may be switched on and off inadvertently.

Implementations that are self-learning may monitor timing errors during active use, and do not require the load to be offline. When a timing error occurs, such implementations detect it, and update registers in retimer 740 accordingly.

Further implementations may calibrate and or learn while monitoring usage conditions, such as temperature (the temperature of the relay and/or the temperature of power switch controller 700), supply voltage, pulse voltage, duration, and/or shape, and the powerline AC frequency. Either calibrator 760 or retimer 740 may include registers, memory, or lookup tables that can store timing parameters for a relay model and conditions that impact the relay model.

Power switch controller 700 may include a clock oscillator 780 to clock its internal circuits and timers. Clock oscillator 780 may be internal or external. While an externally supplied clock, for example from a 32.768 Hz crystal, can be very accurate, some implementations may use an internal clock oscillator that may be free-running or frequency-locked to for example the powerline frequency. An implementation may perform cycle time measurements of the powerline frequency continuously. Should the oscillator drift, then calibrator 760 will be able to correct for this if in self-learning mode. Alternatively, an implementation may correct the first delay time, second delay time, and other time variables for such drift.

Power switch controller 700 may include a power-on reset circuit 790 (POR) to start up in a safe and predetermined state. Power-on reset circuit 790 may provide a POR pulse to retimer 740. Retimer 740 may use the POR pulse to create a second shaped pulse in driver 750, which will ensure that a connected latched relay switches off when the powerline voltage starts.

Figure 8:
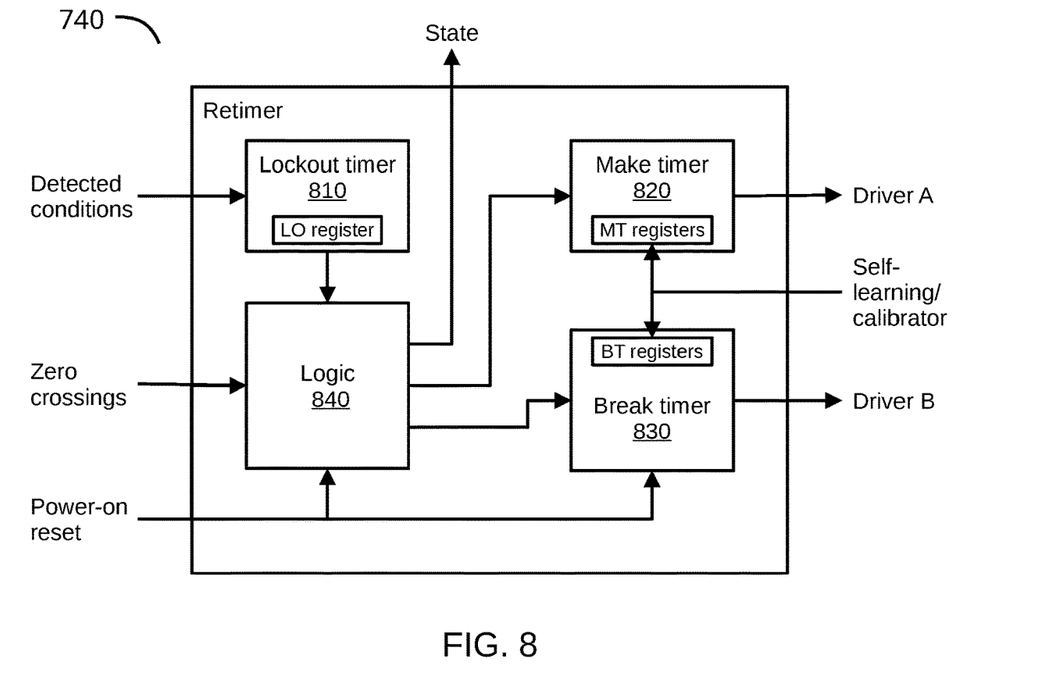
FIG. 8 illustrates details of an example retimer implementation.

FIG. 8 illustrates details of an example retimer 740 implementation. This implementation includes a lockout timer 810 that may include one or more lockout registers, a make timer 820, which may include one or more make time (MT) registers, or memories or lookup tables for make time parameters, a break timer 830, which may include one or more break time (BT) registers, or memories or lookup tables for break time parameters, and logic 840, which may include combinational logic, multiplexers, registers, memories, and other circuits.

Lockout timer 810 receives one or more detected conditions signals from the condition detector. The detected conditions may include a must-make signal, and a must break signal. Lockout timer 810 may pass a must break signal immediately to logic 840. It also starts a timer when it receives a must break signal. The timer may, for example, count down from a lock-out time to zero, or count up from zero until the lock-out time has been reached. When it receives a must-make signal from the condition detector, the implementation passes it on to logic 840 only when the timer has stopped counting and the lock-out time has passed. By doing so, it ensures that AC switch system 600 will not reconnect load 603 to power line 601 until at least the lockout time has passed since it last disconnected load 603 from power line 601. A lockout register (LO) may store the lock-out time, or a parameter associated with the lock-out time.

Some implementations don't include a lockout timer. Those implementations may directly pass the detected conditions signals to logic 840.

Once logic 840 has received a must-make signal or a must break signal from lockout timer 810, it waits for a zero crossing signal from zero crossing detector 730. Upon receiving a zero crossing signal, it passes on a must-make signal to make timer 820, or a must break signal to break timer 830. It may further generate the state indicator output signal, which unifies the must-make and must break signals.

When make timer 820 receives a must-make signal from logic 840, it starts a timer, which may, for example, count down from a first delay time to zero, or count up from zero until the first delay time has been reached. When the timer is timed out, make timer 820 sends a retimed must-make signal to driver 750 to cause it to activate its coil A output 716. When break timer 830 receives a must break signal from logic 840, it starts a timer, which may, for example, count down from a second delay time to zero, or count up from zero until the second delay time has been reached. When the timer is finished, break timer 830 sends a retimed must break signal to driver 750 to cause it to activate its coil B output 718.

Make timer 820 may include one or more make time registers, or a memory, or a lookup table, that stores the first delay time, or a parameter associated with the first delay time. It may further store information from calibrator 760 to compensate the first delay time for time errors measured and/or predicted by calibrator 760. Break timer 830 may include one or more break time registers, or a memory, or a lookup table, that stores the second delay time, or a parameter associated with the second delay time. It may further store information from calibrator 760 to compensate the second delay time for time errors measured and/or predicted by calibrator 760.

Some implementations of retimer 740 may further provide duration and shape information to driver 750. Other implementations may rely on driver 750 to store and use this information to create the desired pulse amplitude, duration, and shape for pulses on its coil A output 716 and coil B output 718.

Figure 9:
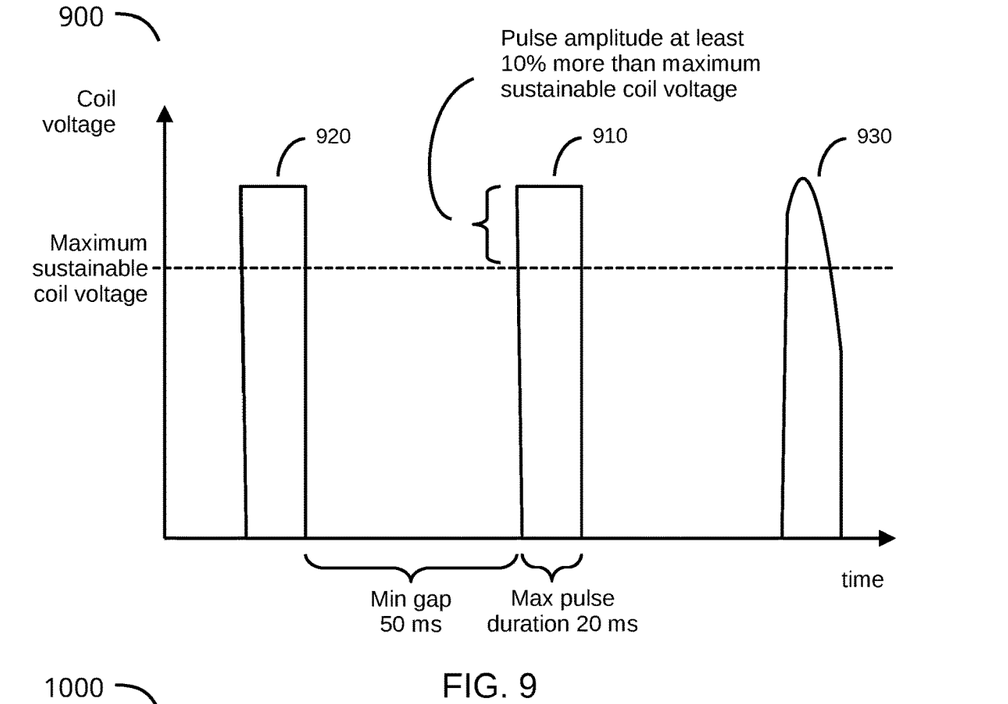
FIG. 9 illustrates example details of the shaped pulses used to switch a latching relay.

FIG. 9 illustrates example details of the shaped pulses 900 used to switch a latching relay. Inventor experiments have shown that asserting the coil of a latching relay with a voltage at least 10% higher than the rated maximum sustained coil voltage may shorten opening and closing times, reduce the variation in the opening and closing time, and reduce the temperature dependence of the opening and closing time. It was found that shaped pulses shorter than 20 milliseconds can reduce bounce in most latching relays. Heating of the relay coil can generally be prevented when successive pulses (whether for make or for break) are at least 50 milliseconds apart.

Implementations use a first shaped pulse 910 for making and a second shaped pulse 920 for breaking. First shaped pulse 910 and second shaped pulse 920 each have a duration shorter than a predetermined maximum duration. For most latching relays the predetermined maximum duration is 20 milliseconds. For some latching relays, the predetermined maximum duration may be as large as 2000 milliseconds, or 2 seconds. First shaped pulse 910 and second shaped pulse 920 each have an amplitude of at least 110% of a maximum sustainable coil voltage. There is a gap between any second shaped pulse 920 and a following first shaped pulse 910 (and vice versa) of at least 50 milliseconds.

Pulse shaping may be simple (pulse height and pulse duration) or more sophisticated, where the pulse shape may have additional features. The technology presented herein makes it possible to switch high currents with a relatively inexpensive switch, while protecting the switch's reliability, and protecting the load against switch-induced spikes. The shaped pulse 930 is an example of a pulse whose shape has additional features. In this example, shaped pulse 930 reaches a peak voltage, after which it gradually falls.

Figure 10:
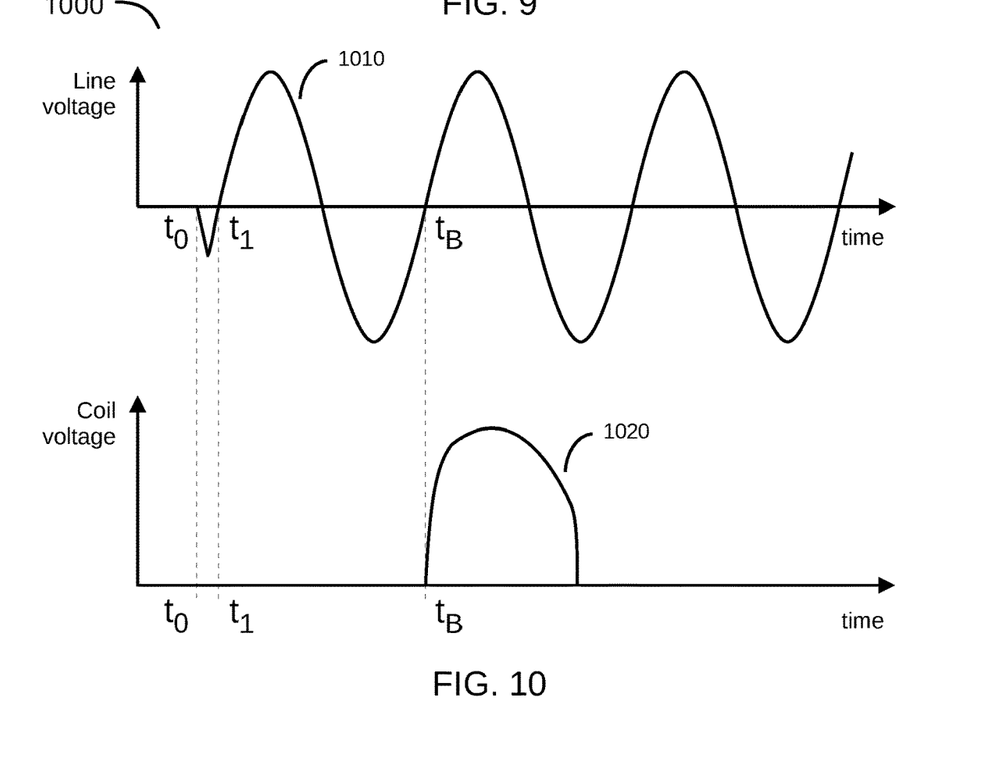
FIG. 10 illustrates timing of a second shaped pulse in response to a power-on reset in an implementation of the technology.

FIG. 10 illustrates timing 1000 of a second shaped pulse in response to a power-on reset in an implementation of the technology. In this example, prior to time $t_0$, the powerline voltage 1010 is zero. At time $t_0$, powerline voltage 1010 starts, initially going negative, and having a numerically first positive zero crossing at time $t_1$. At time $t_B$, powerline voltage 1010 has a numerically second positive zero crossing. For a correct interpretation, "numerically first" and "numerically second" here mean immediately following detection of a non-zero value of powerline voltage 1010 (or concurrent with the detection of a non-zero value of powerline voltage 1010) and immediately following the numerically first, respectively.

In response to the powerline voltage start, power-on reset circuit 790 issues a POR signal to retimer 740, where it is received by logic 840 and break timer 830. Logic 840 waits until it detects a second positive zero crossing (which occurs at time $t_B$), and then it issues a signal to break timer 830, which immediately issues a retimed must break signal for driver 750. Driver 750 outputs a second shaped pulse 1020, aligned with the time $t_B$ of the second positive zero crossing. Second shaped pulse 1020 resets the latched relay to prevent the occurrence of dangerous situations if, for whatever reason, the latched relay happened to be in the on-position prior to applying the powerline voltage to the system.

Although the example in FIG. 10 substantially aligns second shaped pulse 1020 with the second positive zero crossing, some implementations substantially align second shaped pulse 1020 with the second negative zero crossing. Other implementations substantially align second shaped pulse 1020 with the second zero crossing, regardless of the zero crossings' directions.

Figure 11:
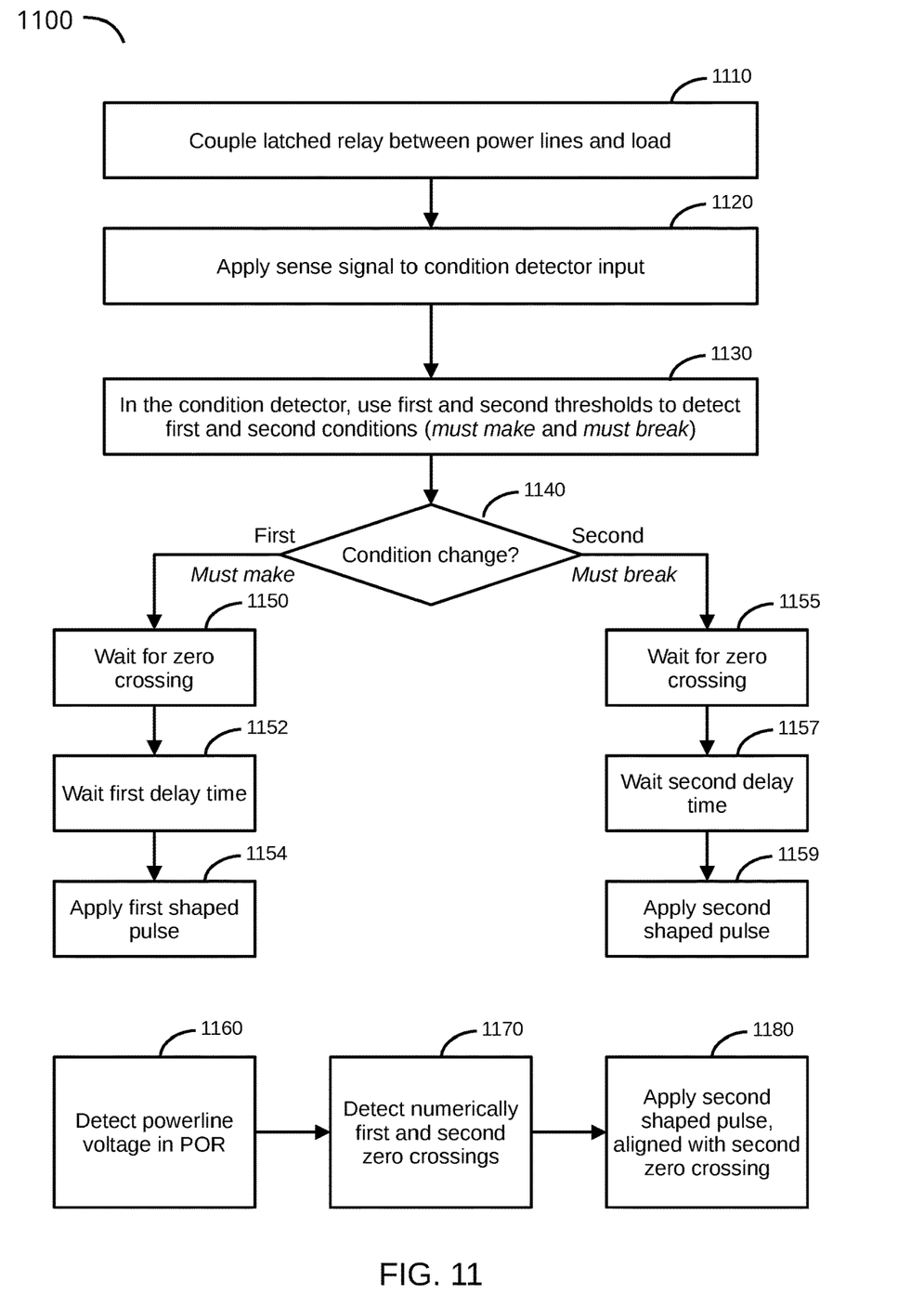
FIG. 11 illustrates a method for switching AC power supplied by a power line to a load.

FIG. 11 illustrates a method 1100 for switching AC power supplied by a power line to a load. Method 1100 includes the following steps.

Step 1110—coupling a latched relay between the power-line and the load.

Step 1120—applying a sense signal to an input of a condition detector.

Step 1130—in the condition detector, comparing a sense signal value with a first threshold to sense a first condition and comparing the sense signal value with a second threshold to sense a second condition, wherein the first condition requires providing power to the load and the second condition requires interrupting power to the load.

Step 1140—waiting for a change in the sensed condition. Upon sensing the first condition, proceeding with Step 1150, Step 1152, and Step 1154. Upon sensing the second condition, proceeding with Step 1155, Step 1157, and Step 1159.

Step 1150—waiting for a first zero crossing.

Step 1152—waiting a first delay time after the first zero crossing.

Step 1154—applying a first shaped pulse to the latched relay to assert the latched relay. The first shaped pulse has a duration shorter than a predetermined maximum duration. It has a maximum amplitude of at least 110% of a maximum sustained coil voltage, and it begins at least 50 milliseconds after a prior first shaped pulse or a prior second shaped pulse ended.

Step 1155—waiting for a second zero crossing.

Step 1157—waiting a second delay time after the second zero crossing.

Step 1159—applying a second shaped pulse to the latched relay to deassert the latched relay. The second shaped pulse has a duration shorter than the predetermined maximum duration. It has a maximum amplitude of at least 110% of the maximum sustainable coil voltage, and it begins at least 50 milliseconds after a prior first shaped pulse or a prior second shaped pulse ended.

Step 1160—detecting the start of a powerline voltage.

Step 1170—detecting the numerically first zero crossing and the numerically second zero crossing in the powerline voltage after detecting the powerline voltage.

Step 1180—applying a second shaped pulse to the latched relay to deassert the latched relay. The second shaped pulse is substantially aligned with the numerically second zero crossing.

Considerations

Although the description has been described with respect to particular implementations thereof, these particular implementations are merely illustrative, and not restrictive. For example, several figures depict an AC switch system operating from a positive supply voltage with reference to a ground terminal. However, all parts of the disclosed technology can be equally applied to switch circuits operating from a negative supply voltage with reference to the ground terminal. Further, the example given illustrates a circuit that uses the line rail as a ground reference, whereas other implementations may use the neutral rail as a ground reference. Some implementations may be used to sense conditions of an analog nature, such as overvoltage and undervoltage, overcurrent and undercurrent, temperature, humidity, pH, etc., whereas other implementations may be used to sense conditions of a digital nature, such as a result of a timer, a microprocessor control output signal, a user pressing a button, etc.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board PCB using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. All such variations and modifications are to be considered within the ambit of the present disclosed technology the nature of which is to be determined from the foregoing description.

Any suitable technology for manufacturing electronic devices can be used to implement the circuits of particular implementations, including CMOS, FinFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A method for switching AC power supplied by a powerline to a load, comprising:
    coupling a pulse-controllable bistable switch between the powerline and the load;
    applying a sense signal to an input of a condition detector;
    in the condition detector, comparing a sense signal value with a first threshold to sense a change to a first condition and comparing the sense signal value with a second threshold to sense a change to a second condition, wherein the first condition requires providing power to the load and the second condition requires interrupting power to the load;
    upon sensing the change to the first condition:
        detecting a first zero crossing;
        waiting a first delay time after the first zero crossing; and
        applying a first shaped pulse to the pulse-controllable bistable switch to assert the pulse-controllable bistable switch;
    wherein:
        the first shaped pulse has a duration shorter than a predetermined maximum duration;

the first shaped pulse has a maximum amplitude of at least 110% of a maximum sustainable coil voltage; and the first shaped pulse begins at least 50 milliseconds after a prior first shaped pulse or a prior second shaped pulse ended.

2. The method of claim 1, wherein the predetermined maximum duration is 20 milliseconds.

3. The method of claim 1, wherein the predetermined maximum duration is 2000 milliseconds.

4. The method of claim 1, further comprising:
upon sensing a change to the second condition:
detecting a second zero crossing;
waiting a second delay time after the second zero crossing; and
applying a second shaped pulse to the pulse-controllable bistable switch to deassert the pulse-controllable bistable switch;
wherein:
the second shaped pulse has a duration shorter than the predetermined maximum duration;
the second shaped pulse has a maximum amplitude of at least 110% of the maximum sustained coil voltage; and
the second shaped pulse begins at least 50 milliseconds after a prior first shaped pulse or a prior second shaped pulse ended.

5. The method of claim 1, wherein:
the first shaped pulse begins at least a lockout time after a prior second shaped pulse started.

6. The method of claim 5, wherein:
the lockout time is determined by at least one of:
a register value;
a content of a volatile memory;
a content of a non-volatile memory;
a content of a one-time-programmable memory;
a capacitor value;
a resistor value;
an IC bond option;
a voltage applied to an IC pin; or
an IC mask option.

7. The method of claim 1, wherein:
the first delay time is determined by at least one of:
a register value;
a content of a volatile memory;
a content of a non-volatile memory;
a content of a one-time-programmable memory;
a capacitor value;
a resistor value;
an IC bond option;
a voltage applied to an IC pin; or
an IC mask option.

8. The method of claim 1, wherein:
the duration and/or maximum amplitude of the first shaped pulse is configurable, and a duration and/or maximum amplitude of the second shaped pulse is configurable.

9. The method of claim 1, wherein:
the pulse-controllable bistable switch comprises a latching relay.

10. The method of claim 1, wherein the first threshold and the second threshold determine a hysteresis.

11. The method of claim 1, wherein the first condition represents a temperature, and the first threshold and the second threshold represent a maximum allowed temperature.

12. The method of claim 1, wherein the first condition represents a switched signal.

13. The method of claim 1, wherein:
sensing the first condition comprises:
measuring the sense signal value; and
comparing the sense signal value with first window thresholds;
and sensing the second condition comprises:
measuring the sense signal value; and
comparing the sense signal value with second window thresholds; and
the first window thresholds and the second window thresholds determine a hysteresis.

14. The method of claim 13, wherein the second condition represents a powerline voltage, and the first window thresholds and the second window thresholds represent a minimum allowed voltage and a maximum allowed voltage.

15. The method of claim 1, further comprising:
detecting a powerline voltage;
detecting a numerically first zero crossing and a numerically second zero crossing in the powerline voltage after detecting the powerline voltage; and
applying a second shaped pulse to the pulse-controllable bistable switch to deassert the pulse-controllable bistable switch, wherein the second shaped pulse is substantially aligned with the numerically second zero crossing.

16. The method of claim 1, further comprising:
applying one or more additional sense signals to one or more additional inputs of the condition detector;
in the condition detector, comparing the one or more additional sense signals to one or more additional thresholds to sense one or more additional first conditions and second conditions; and
generating a must-make signal based on a combination of the first condition and the one or more additional first conditions, and a must break signal based on a combination of the second condition and the one or more additional second conditions.

17. A power switch controller comprising:
a condition detector with one or more sense inputs and a condition result output;
a zero crossing detector with a zero input, and a zero crossing indicator output;
a retimer with a condition result input coupled with the condition result output to receive a detected conditions signal, a zero crossing input coupled with the zero crossing indicator output, and one or more retimed signal outputs; and
a driver with an input coupled with the one or more retimed signal outputs, and one or more coil outputs;
wherein:
the detected conditions signal includes a must-make value and a must-break value;
the one or more sense inputs, the zero input and the one or more coil outputs are coupled with external terminals of the power switch controller;
the condition detector includes a threshold detector and/or a window detector;
the condition detector generates the detected conditions signal in response to a sense signal on the sense input by comparing a sense signal value with a threshold in the threshold detector and/or by comparing the sense signal value with a window in the window detector;
the zero crossing detector is configured to detect times of zero transitions in an AC power signal;

the retimer is configured to output a retimed signal in response to a change in the detected conditions signal by waiting for a time of a zero transition in the AC power signal and outputting a retimed must-make value after a first delay time after the zero transition in the AC power signal or outputting a retimed must-break value after a second delay time after the zero transition in the AC power signal;

the driver is configured to output a first shaped pulse on one of the one or more coil outputs in response to a retimed must-make value and to output a second shaped pulse on one of the one or more coil outputs in response to a retimed must-break value;

the first shaped pulse and the second shaped pulse each have a duration shorter than 20 milliseconds; and the first shaped pulse begins at least 50 milliseconds after a prior second shaped pulse has ended.

18. The power switch controller of claim 17, further including a power-on-reset function configured to:

detect a start of a powerline voltage;

detect a numerically first zero crossing and a numerically second zero crossing in the powerline voltage after detecting the start of the powerline voltage; and output a second shaped pulse, wherein the second shaped pulse is substantially aligned with the numerically second zero crossing.

19. An AC switch system, comprising:

a latching relay coupled between a power line and a load;

a power switch controller configured to drive the latching relay and coupled with a latching relay coil via at least one coil output; and a zero crossing detection resistor coupled between the power line and a power switch controller zero input;

a sense input of the power switch controller, sensing one or more predetermined conditions that cause the power switch controller to activate the latching relay by applying a first shaped pulse to a first coil terminal of the latching relay, and/or to deactivate the latching relay by applying a second shaped pulse to a second coil terminal of the latching relay, wherein:

the first shaped pulse and the second shaped pulse each have a duration shorter than 20 milliseconds;

the first shaped pulse and the second shaped pulse each have a maximum amplitude of at least 110% of a maximum sustained coil voltage; and the first shaped pulse begins at least 50 milliseconds after a prior second shaped pulse has ended.

20. The AC switch system of claim 19, further comprising a circuit that generates a supply voltage $V_{DD}$ within a single cycle of an AC voltage on the power line, and a power-on-reset function configured to:

detect a start of the AC voltage on the power line;

detect a numerically first zero crossing and a numerically second zero crossing in the AC voltage on the power line after detecting the start of the AC voltage on the power line; and apply a second shaped pulse to the latching relay to deassert the latching relay, wherein the second shaped pulse is substantially aligned with the numerically second zero crossing.

\* \* \* \* \*